United States Patent
Lee et al.

(10) Patent No.: US 9,336,493 B2
(45) Date of Patent: May 10, 2016

(54) SYSTEMS AND METHODS FOR CLUSTERING TIME SERIES DATA BASED ON FORECAST DISTRIBUTIONS

(75) Inventors: Taiyeong Lee, Cary, NC (US); David Rawlins Duling, Durham, NC (US)

(73) Assignee: SAS Institute Inc., Cary, NC (US)

( * ) Notice: Subject to any disclaimer, the term of this patent is extended or adjusted under 35 U.S.C. 154(b) by 330 days.

(21) Appl. No.: 13/153,899

(22) Filed: Jun. 6, 2011

(65) Prior Publication Data

US 2012/0310939 A1    Dec. 6, 2012

(51) Int. Cl.
   *G06F 17/00*   (2006.01)
   *G06N 99/00*   (2010.01)
   *G06Q 10/04*   (2012.01)
   *G06F 17/30*   (2006.01)

(52) U.S. Cl.
   CPC ........ *G06N 99/005* (2013.01); *G06F 17/30997* (2013.01); *G06Q 10/04* (2013.01); *G06F 17/30699* (2013.01)

(58) Field of Classification Search
   CPC .................................................. G06F 17/30699
   USPC ............................ 707/736, 999.102, 637, 748
   See application file for complete search history.

(56) References Cited

U.S. PATENT DOCUMENTS

| | | |
|---|---|---|
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |

(Continued)

OTHER PUBLICATIONS

Product Brochure, ForecastPRO, (2000) 12 pp.

(Continued)

*Primary Examiner* — Eliyah S Harper
(74) *Attorney, Agent, or Firm* — Kilpatrick Townsend & Stockton LLP

(57) ABSTRACT

In accordance with the teachings described herein, systems and methods are provided for clustering time series based on forecast distributions. A method for clustering time series based on forecast distributions may include: receiving time series data relating to one or more aspects of a physical process; applying a forecasting model to the time series data to generate forecasted values and confidence intervals associated with the forecasted values, the confidence intervals being generated based on distribution information relating to the forecasted values; generating a distance matrix that identifies divergence in the forecasted values, the distance matrix being generated based the distribution information relating to the forecasted values; and performing a clustering operation on the plurality of forecasted values based on the distance matrix. The distance matrix may be generated using a symmetric Kullback-Leibler divergence algorithm.

19 Claims, 15 Drawing Sheets

(56) References Cited

U.S. PATENT DOCUMENTS

| | | | |
|---|---|---|---|
| 6,542,869 B1 | 4/2003 | Foote | |
| 6,564,190 B1 | 5/2003 | Dubner | |
| 6,591,255 B1 | 7/2003 | Tatum et al. | |
| 6,640,227 B1 | 10/2003 | Andreev | |
| 6,735,738 B1 | 5/2004 | Kojima | |
| 6,775,646 B1 | 8/2004 | Tufillaro et al. | |
| 6,792,399 B1 | 9/2004 | Phillips et al. | |
| 6,826,575 B1 * | 11/2004 | Waclawski | 1/1 |
| 6,850,871 B1 | 2/2005 | Barford et al. | |
| 6,850,937 B1 * | 2/2005 | Hisamitsu et al. | 707/750 |
| 6,878,891 B1 | 4/2005 | Josten et al. | |
| 6,928,398 B1 | 8/2005 | Fang et al. | |
| 7,072,863 B1 | 7/2006 | Phillips et al. | |
| 7,103,222 B2 | 9/2006 | Peker | |
| 7,171,340 B2 | 1/2007 | Brocklebank | |
| 7,216,088 B1 | 5/2007 | Chappel et al. | |
| 7,236,940 B2 | 6/2007 | Chappel | |
| 7,251,589 B1 | 7/2007 | Crowe et al. | |
| 7,260,550 B1 | 8/2007 | Notani | |
| 7,480,659 B2 * | 1/2009 | Chmura et al. | 1/1 |
| 7,610,214 B1 | 10/2009 | Dwarakanath et al. | |
| 7,711,734 B2 | 5/2010 | Leonard | |
| 8,245,135 B2 * | 8/2012 | Cai et al. | 715/254 |
| 2002/0107853 A1 * | 8/2002 | Hofmann et al. | 707/7 |
| 2002/0169657 A1 | 11/2002 | Singh et al. | |
| 2003/0105660 A1 | 6/2003 | Walsh et al. | |
| 2003/0110016 A1 | 6/2003 | Stefek et al. | |
| 2003/0187719 A1 | 10/2003 | Brocklebank | |
| 2003/0200134 A1 | 10/2003 | Leonard et al. | |
| 2004/0086185 A1 * | 5/2004 | Sun | 382/224 |
| 2004/0172225 A1 | 9/2004 | Hochberg et al. | |
| 2005/0102107 A1 | 5/2005 | Porikli | |
| 2005/0249412 A1 | 11/2005 | Radhakrishnan et al. | |
| 2006/0063156 A1 | 3/2006 | Willman et al. | |
| 2006/0064181 A1 | 3/2006 | Kato | |
| 2006/0112028 A1 | 5/2006 | Xiao et al. | |
| 2006/0143081 A1 | 6/2006 | Argaiz | |
| 2006/0247900 A1 | 11/2006 | Brocklebank | |
| 2007/0239753 A1 | 10/2007 | Leonard | |
| 2007/0282785 A1 * | 12/2007 | Fayyad et al. | 707/1 |
| 2007/0291958 A1 | 12/2007 | Jehan | |
| 2008/0147702 A1 * | 6/2008 | Bernhard | 707/102 |
| 2008/0294651 A1 | 11/2008 | Masuyama et al. | |
| 2009/0150368 A1 * | 6/2009 | Orumchian et al. | 707/4 |
| 2009/0164171 A1 * | 6/2009 | Wold et al. | 702/179 |
| 2010/0036643 A1 | 2/2010 | Marvasti et al. | |
| 2010/0036857 A1 | 2/2010 | Marvasti et al. | |
| 2010/0161652 A1 * | 6/2010 | Bellare et al. | 707/769 |
| 2010/0189354 A1 * | 7/2010 | de Campos et al. | 382/190 |
| 2011/0035379 A1 * | 2/2011 | Chen et al. | 707/740 |
| 2011/0196872 A1 * | 8/2011 | Sims et al. | 707/740 |
| 2012/0102066 A1 * | 4/2012 | Eronen et al. | 707/769 |
| 2013/0198152 A1 * | 8/2013 | McGhee et al. | 707/693 |

OTHER PUBLICATIONS

Automatic Forecasting Systems Inc., Autobox 5.0 for Windows User's Guide, 82 pp. (1999).

Quest Software, "Funnel Web Analyzer: Analyzing the Way Visitors Interact with Your Web Site", download from http://www.quest.com/funnel_web/analyzer 2 pp.

Funnel Web Web site Analysis Report, Funnel Web Demonstration, Clients History, download from http://www/quest.com/funnel_web/analyzer/sample.CiientHist.html 2pp.

Funnel Web Web site Analysis Report, Funnel Web Demonstration, Authenticated Users History, download from http://www.quest.com/funnel_web/analyzer/sample/UserHist.html 1 pg.

SAS Institute Inc., SAS/ETS User's Guide, Version 8, pp. 577-631 and 1307-1323 (1999).

Keogh, E. & Pazzani, M. (2001). Derivative Dynamic Time Warping. In First SIAM International Conference on Data Mining (SDM'2001), Chicago, USA, pp. 5-6.

Oates et al., Clustering Time Series with Hidden Markov Models and Dynamic Time Warping, 1999, Computer Science Department, LGRC University of Massachusetts, in Proceedings of the IJCAI-99, pp. 1-5.

Crowe, Keith E. et al., U.S. Appl. No. 11/431,089 filed May 9, 2006 entitled "Computer-Implemented System and Method for Generating Forecasts".

Jackson, Wilma S. et al., U.S. Appl. No. 11/431,127 filed May 9, 2006 entitled "Computer-Implemented Systems and Methods for Defining Events".

Park, Youngjin et al., U.S. Appl. No. 11/431,116 filed May 9, 2006 entitled "Computer-Implemented Systems and Methods for Processing Time Series Data".

Crowe, Keith E. et al., U.S. Appl. No. 11/431,123 filed May 9, 2006 entitled "Computer-Implemented Systems and Methods for Storing Data Analysis Models".

"Data Mining Group", www.dmg.org, printed May 9, 2005, 3 pp.

Kumar, Mahesh, "Combining Forecasts Using Clustering", Rutcor Research Report 40-2005, Dec. 2005, cover p. and pp. 116.

Leonard, Michael, "Promotional Analysis and Forecasting for Demand Planning: A Practical Time Series Approach", with exhibits 1 and 2, SAS Institute Inc., Cary, North Carolina, 2000, 50 pp.

Leonard, Michael, "Large-Scale Automatic Forecasting Using Inputs and Calendar Events", abstract and presentation, International Symposium on Forecasting Conference, Jul. 4-7, 2004, 56 pp.

Leonard, Michael et al., "Mining Transactional and Time Series Data", abstract and presentation, International Symposium of Forecasting, 2003, 23 pp.

Leonard, Michael, "Large-Scale Automatic Forecasting: Millions of Forecasts", abstract and presentation, International Symposium of Forecasting, 2002, 156 pp.

Leonard, Michael et al., "Mining Transactional and Time Series Data", abstract, presentation and paper, SUGI, Apr. 10-13, 2005, 142 pp.

Leonard, Michael, "Predictive Modeling Markup Language for Time Series Models", abstract and presentation, International Symposium on Forecasting Conference, Jul. 4-7, 2004, 35 pp.

Leonard, Michael, "Large Scale Automatic Forecasting Using Inputs and Calendar Events", White Paper, 2005, pp. 1-27.

van Wijk, Jarke J. et al., "Cluster and Calendar based Visualization of Time Series Data", IEEE Symposium on Information Visualization (INFOVIS '99), San Francisco, pp. 1-6 [Oct. 25-26, 1999].

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Harrison, H.C. et al., "An Intelligent Business Forecasting System", ACM Annual Computer Science Conference, pp. 229-236 (1993).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Kobbacy, Khairy A.H., et al., "Towards the development of an intelligent inventory management systems", Abstract, Integrated Manufacturing Systems, vol. 10, Issue 6, (1999) 11 pp.

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Park, Kwan Hee, "Development and evaluation of a prototype expert system for forecasting models", Abstract, Mississippi State University, (1990) 1 pg.

Tashman, Leonard J. et al., "Automatic Forecasting Software: A Survey and Evaluation", Abstract, International Journal of Forecasting, vol. 7, Issue 2, (Aug. 1991) 1 pg.

Wang, Liang et al., "An Expert System for Forecasting Model Selection", IEEE, pp. 704-709 (1992).

Non-Final Office Action of Aug. 29, 2009 for U.S. Appl. No. 11/696,951, 28 pages.

Notice of Allowance of Mar. 10, 2010 for U.S. Appl. No. 11/696,951, 10 pages.

(56) References Cited

OTHER PUBLICATIONS

Alonso, A.M. et al., "Time series clustering based on forecast densities," Computational Statistics & Data Analysis, vol. 51, Issue 2, pp. 1-22 (Nov. 2006).

Kullback, S. et al., "On Information and Sufficiency," The Annals of Mathematical Statistics, pp. 79-86 (1951).

Quest Software, "Funnel Web Analyzer: Analyzing the Way Visitors Interact with Your Web Site", download from http://www.quest.com/funnel_web/analyzer 2 pp (Accessed Way Visitors on Mar. 18, 2002).

Funnel Web Web site Analysis Report, Funnel Web Demonstration, Clients History, download from http://www/quest.com/funnel web/analyzer/sample.CiientHist.html 2 pp (Accessed on Mar. 18, 2002).

Funnel Web Web site Analysis Report, Funnel Web Demonstration, Authenticated Users History, download from http://www.quest.com/funnel_web/analyzer/sample/UserHist.html 1 pg (Accessed on Mar. 18, 2002).

* cited by examiner

| | Export Data | |
|---|---|---|
| | Exported Data | Kullback-Leibler Distance |
| | Extended Value | Predict Value |
| | Clustering Lead Point | 1 |

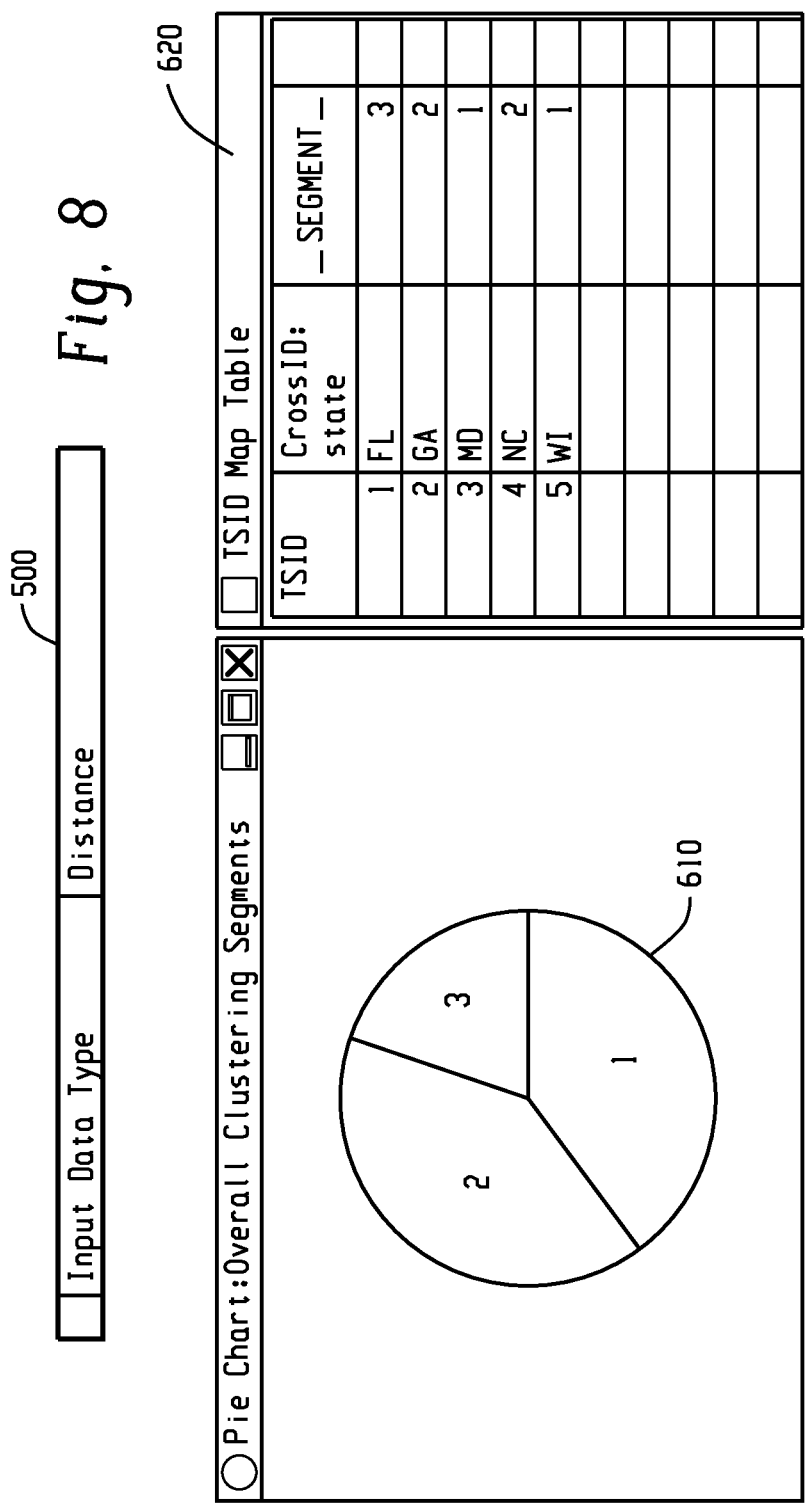

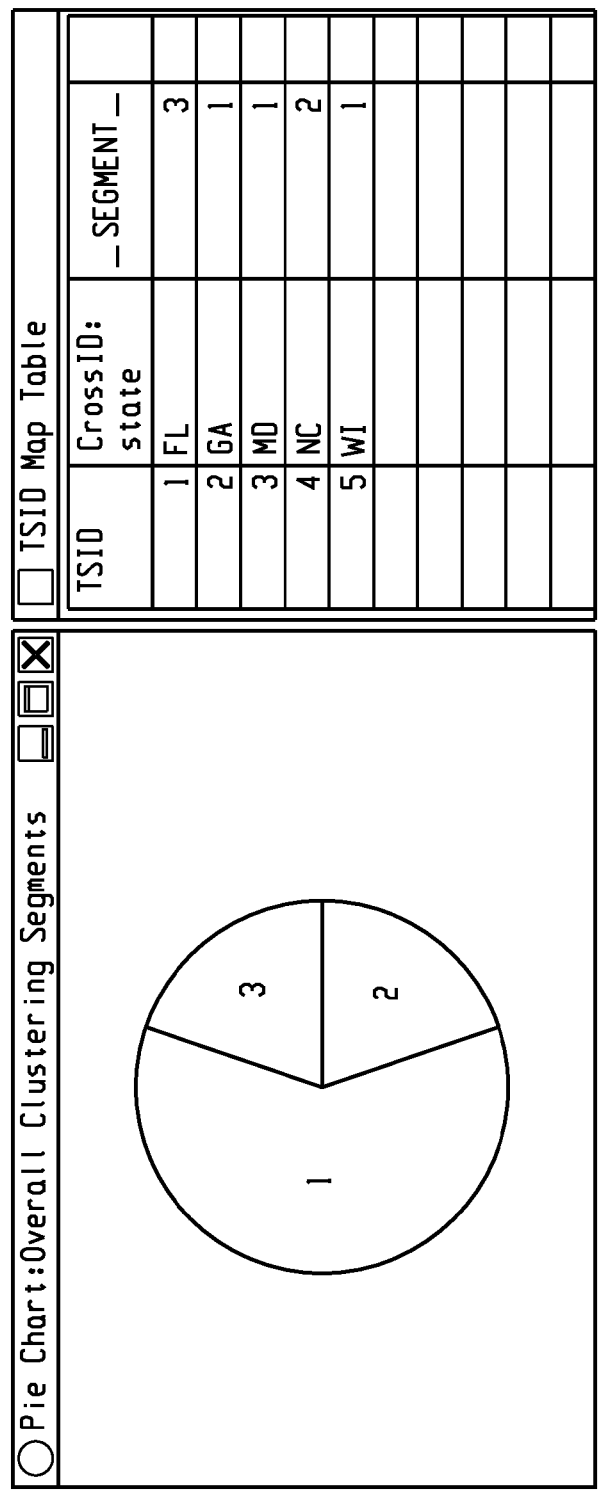

SYSTEMS AND METHODS FOR CLUSTERING TIME SERIES DATA BASED ON FORECAST DISTRIBUTIONS

FIELD

The technology described in this patent document relates generally to time series data mining, and more particularly to clustering time series based on forecast distributions.

BACKGROUND

Clustering time series is often an important task performed in time series data mining applications. Typically, a historical data set is used, either directly or indirectly, as the source of clustering operations. That is, clustering techniques typically focus on the similarity patterns of time series data that has already been observed. It may be desirable, however, to provide time series clustering for a specific time or period of time in the future based on forecast data, instead of clustering based on observed data over time.

SUMMARY

In accordance with the teachings described herein, systems and methods are provided for clustering time series based on forecast distributions. A system may include one or more processors and one or more memory devices, the one or more memory devices including a database for storing time series data relating to one or more aspects of a physical process. A forecasting program may be stored in the one or more memory devices and executable by the one or more processors, when executed the forecasting program being configured to apply a forecasting model to the time series data to generate forecasted values and confidence intervals associated with the forecasted values, the confidence intervals being generated based on distribution information relating to the forecasted values. A divergence program may be stored in the one or more memory devices and executable by the one or more processors, when executed the divergence program being configured to generate a distance matrix that identifies divergence in the forecasted values, the distance matrix being generated based the distribution information relating to the forecasted values. The divergence program may generate the distance matrix using a symmetric Kullback-Leibler divergence algorithm. A clustering program may be stored in the one or more memory devices and executable by the one or more processors, when executed the clustering program being configured to perform a clustering operation on the plurality of forecasted values based on the distance matrix.

A method for clustering time series based on forecast distributions may include: receiving time series data relating to one or more aspects of a physical process; applying a forecasting model to the time series data to generate forecasted values and confidence intervals associated with the forecasted values, the confidence intervals being generated based on distribution information relating to the forecasted values; generating a distance matrix that identifies divergence in the forecasted values, the distance matrix being generated based the distribution information relating to the forecasted values; and performing a clustering operation on the plurality of forecasted values based on the distance matrix. The distance matrix may be generated using a symmetric Kullback-Leibler divergence algorithm.

BRIEF DESCRIPTION OF THE DRAWINGS

FIG. 4 is a block diagram of another example system for clustering time series data based on forecast distributions.

FIGS. 5-15 provide examples of how the system of FIG. 4 may be used to cluster forecasts at specific points in the future.

FIG. 17 depicts an example of forecasting lead and clustering lead point parameter values for the system of FIG. 16.

FIG. 18 illustrates a clustered output that may be generated based on the example parameters from FIG. 17.

DETAILED DESCRIPTION

Figure 1:
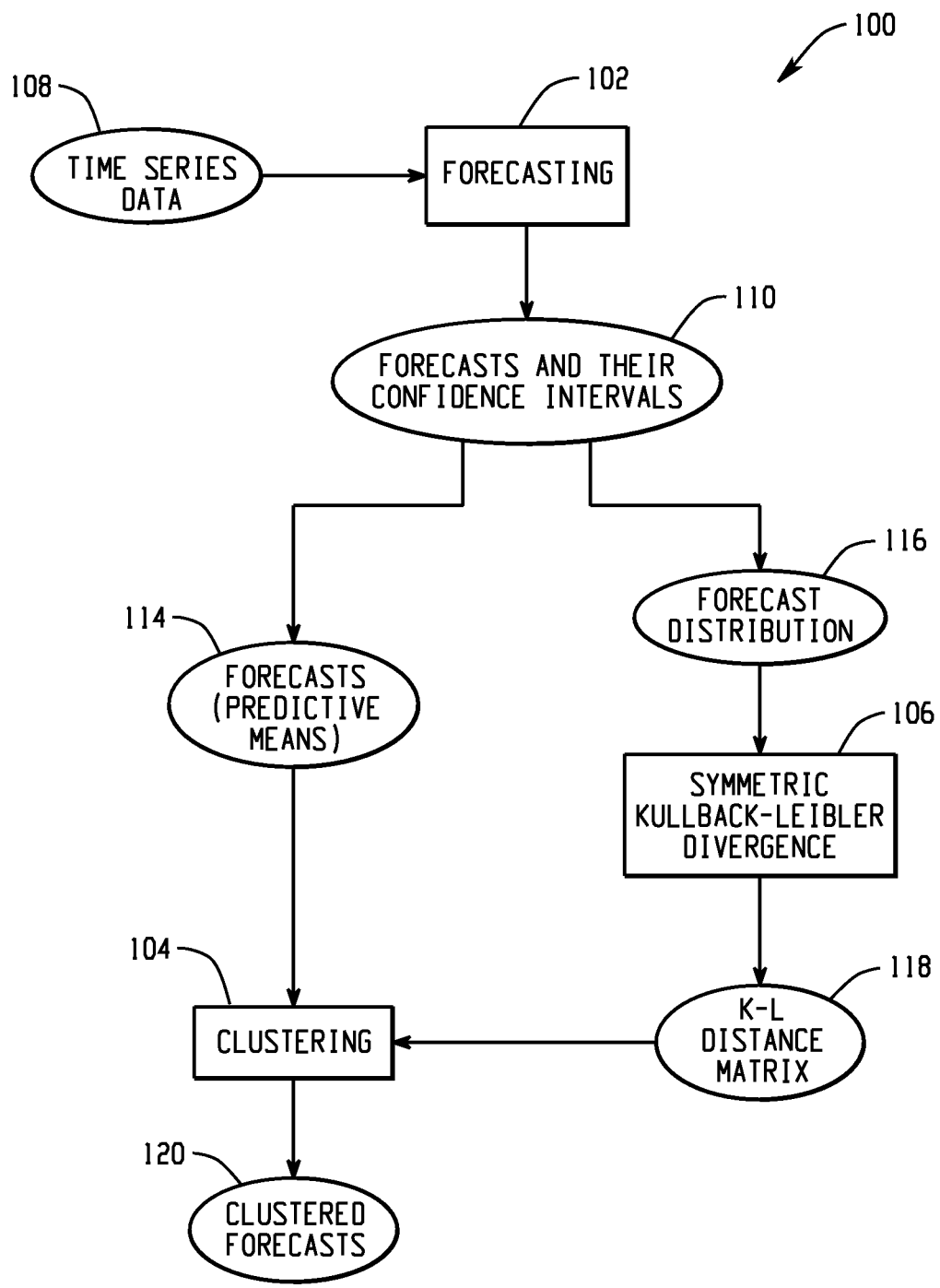
FIG. 1 is a block diagram of an example system for clustering time series data based on forecast distributions.

FIG. 1 is a block diagram of an example system 100 for clustering time series data based on forecast distributions. The system includes a forecasting block 102, a clustering block 104, and a symmetric Kullback-Leibler divergence block 106. In operation, the system 100 receives time series data 108 relating to one or more aspects of a physical process, such as time series data relating to inventory items, time series data relating to sales, and/or other suitable types of time series data. The forecasting block 102 then applies a forecasting model to the time series data to generate forecasts and associated confidence intervals 110. The forecasts 114 are passed to the clustering block 104, and forecast distribution information 116 that is used by the forecasting block 102 in the calculation of the confidence intervals is passed to the symmetric Kullback-Leibler divergence block 106 for use in the generation of a distance matrix 118 that identifies divergence in the forecasts. The distance matrix 118 is then used by the clustering block 104 to perform a clustering operation on the forecasted values 114 to generate an output 120.

It should be understood that the system blocks 102, 104, 106 illustrated in FIG. 1, as well as system blocks in other figures described herein, may be programs that are implemented by software instructions executing on one or more processing devices. In addition, the software blocks may each be implemented in a single, integrated software application, or in separate software applications.

The forecasting block 102 may be a software application that calculates forecasts and their associated confidence intervals 110 based on received time series data 108 utilizing a forecasting model, such as a moving average (weighted) model, an exponential smoothing model, an autoregressive model, an autoregressive integrated moving average model (ARIMA), or some other suitable type of forecasting model. The forecasting block 102 may, for example, be implemented using the SAS® Enterprise Miner™ software sold by SAS Institute Inc. of Cary, N.C. The forecasts 114 generated by the forecasting block 102 may be considered predictions over time, and the uncertainty of each prediction may be expressed by a confidence interval calculated through a distribution assumption in the model error term. A Gaussian error assumption is commonly used for the forecast confidence interval. Thus, when a forecasting application, such as SAS® Enterprise Miner™, produces forecast values 114, it also provides the confidence intervals of forecasts under the assumption of a Gaussian white noise process. That is, the confidence intervals of forecast values are calculated by the forecasting block 102 from the normal distributions of forecasts with their estimated means and variances.

The symmetric Kullback-Leibler divergence block 106 utilizes the forecast distributions 116 used by the forecasting block 102 in the calculation of forecast confidence intervals to perform a Kullback-Leibler divergence calculation. However, because the Kullback-Leibler divergence is not symmetric, and is thus not a metric, block 106 uses a symmetric version of Kullback-Leibler divergence (as described below) to calculate the dissimilarity matrix among forecast densities. The Kullback-Leibler divergence between two forecast densities is obtainable using the same distribution information used by the forecasting block 102 in generating the confidence intervals. The resulting Kullback-Leibler distance matrix 118 among all pairs of the forecasted values 114 may then be used as a forecast clustering input source to the clustering block 104. In this way, significant processing time and resources may be saved by utilizing the same distribution information to generate the distance matrix 118 for clustering as is used to generate the confidence intervals during the forecasting process.

The clustering block 104 may be implemented using a hierarchical clustering algorithm, such as single-link clustering, average-link clustering or complete-link clustering. It should be understood, however, that in other examples any distance-based clustering algorithm may be utilized. The clustering block 104 may, for example, be implemented using a software application that enables the user to select a particular clustering algorithm and/or to specify one or more parameters of the clustering operation. For instance, the clustering block 104 may be implemented using the SAS®/STAT or SAS® Enterprise Miner™ software sold by SAS Institute Inc. of Cary, N.C. In another example, the cluster block 104 may be implemented using a software module that is included in the same software application as the forecasting block 102 and/or the symmetric Kullback-Leibler divergence block 106. The output 120 generated by the cluster block 104 may, for example, include report information that illustrates the results of the hierarchical clustering operation.

To illustrate how the Kullback-Leibler distance matrix 118 may be generated by block 106, suppose that there are two normal densities, $\rho_0$:$N(\mu_0, \sigma_0^2)$ and $\rho_1$:$N(\mu_1, \sigma_1^2)$, then Kullback-Leibler divergence between two densities is defined and simplified as follows:

$$KLD(\rho_1 \| \rho_0) = \int \rho_1(x) \log \frac{\rho_1(x)}{\rho_0(x)} dx = \frac{1}{2\sigma_1^2}[(\mu_1 - \mu_0)^2 + (\sigma_1^2 - \sigma_0^2)] + \log \frac{\sigma_0}{\sigma_1} \qquad (1)$$

Since the Kullback-Leibler divergence is not symmetric, a symmetric version for use in generating the distance matrix 118 may be defined as:

$$SKLD(\rho_1, \rho_0) = \frac{1}{2}\{KLD(\rho_1 \| \rho_0) + KLD(\rho_0 \| \rho_1)\} \qquad (2)$$

As explained above, the forecasting confidence intervals generated by the forecasting block 102 are calculated based on normal distribution assumption in error. Therefore, the k-step ahead forecast, $\hat{Y}_t(k)$, is assumed to follow $N(\hat{Y}_t(k), V(\hat{Y}_t(k)))$. For example, if the forecasting block 102 utilizes a simple exponential smoothing model, $Y_t = \mu_t + \epsilon_t$, then the smoothing equation is: $S_t = \alpha Y_t + (1-\alpha)S_{t-1}$, and the k-step ahead forecast of $Y_t$ is $S_t$, i.e., $\hat{Y}_t(k) = S_t$.

The simple exponential smoothing model uses an exponentially weighted moving average of past values. The model is equivalent to an ARIMA(0,1,1) model without a constant. Therefore, the model is: $(1-B)Y_t = (1-\theta B)\epsilon_t$, where $\theta = 1-\alpha$, then $Y_t = \epsilon_t + \sum_{j=1}^{\infty} \alpha \epsilon_{t-j}$. Thus, the variance of $\hat{Y}_t(k)$ is:

$$V(\hat{Y}_t(k)) = V(\epsilon_t[1 + \sum_{j=1}^{k-1} \alpha^2]) = V(\epsilon_t)[1 + (k-1)\alpha^2].$$

Under the assumption that $\hat{Y}_t(k)$ follows $N(\hat{Y}_t(k), V(\hat{Y}_t(k)))$, the Kullback-Leibler divergence of two forecast densities at a future point may be obtained using equations (1) and (2), above.

Figure 2:
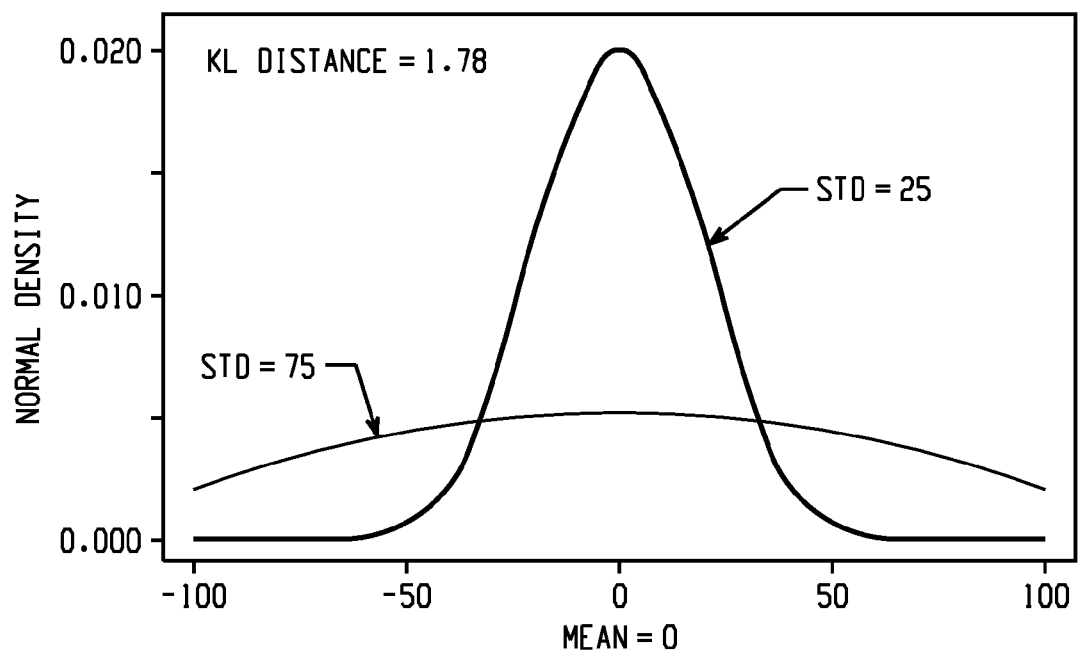
FIGS. 2 and 3 are graphs that help to illustrate why it may be important to consider distribution information when clustering forecast values.
Figure 3:
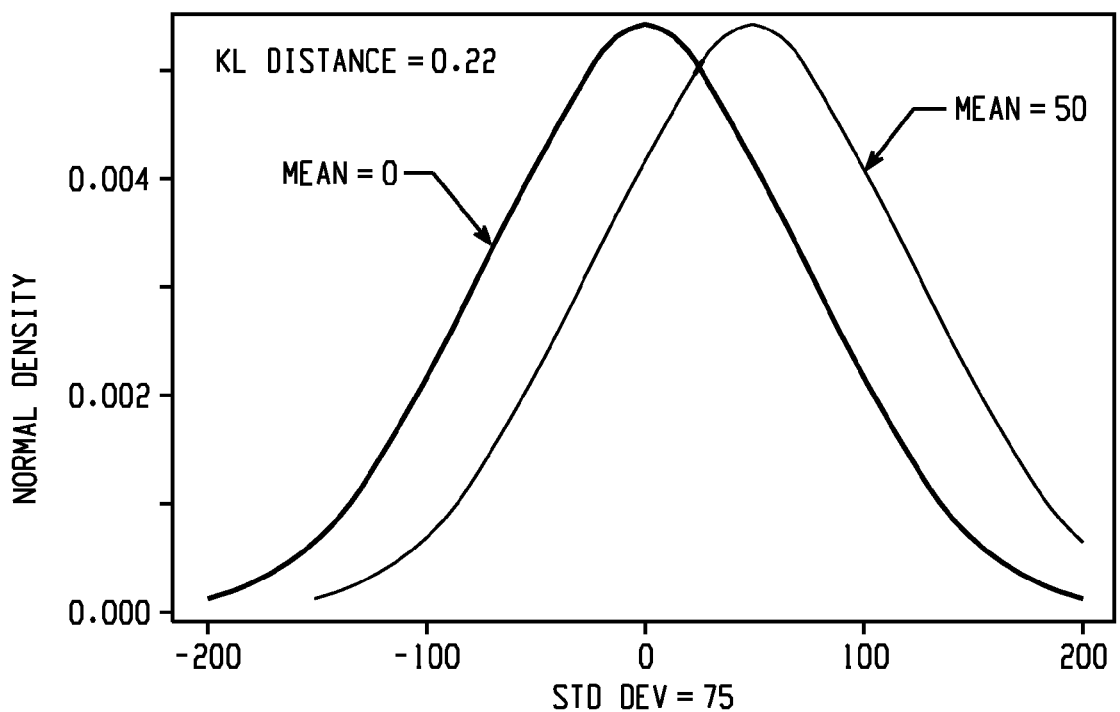

FIGS. 2 and 3 are graphs that help to illustrate why it may be important to consider distribution information when clustering forecast values. Specifically, the graphs illustrated in FIGS. 2 and 3 show the reverse relationship between Kullback-Leibler distance using mean and variance information and forecasted values using only mean differences. As shown in FIG. 2, when two forecast values (predicted mean values) are the same and the forecast distribution information is ignored, the two forecast values are clustered into the same category because the clustering is based on one dimensional Euclidian distance. However, when a Kullback-Leibler divergence is utilized, clustering may produce a difference result, even though the one dimensional Euclidian distance is zero.

As an example, consider retail sales data for two stores. In the example shown in FIG. 2, the forecast of sales increment from the two stores is the same (i.e., the predicted mean is zero), but their standard deviations are different. In this situation, without considering the forecast distribution, the two stores would likely be clustered into the same segment and may thus be assigned the same sales price policy for the next week. In contrast, the example illustrated in FIG. 3 shows two different forecasts, one with a zero forecast and the other with a forecast of 50 (mean=50), but their standard deviations are the same (STD=75). If we just consider the predicted mean, the two stores in the example of FIG. 3 may be classified into different segments. However, based on Kullback-Leibler divergence, the stores in FIG. 3 (K-L distance=0.22) are much closer to each other in sales increment forecasting than the two stores in the example of FIG. 2 (K-L distance=1.78). That is, based on the Kullback-Leibler divergence, the two stores in FIG. 2 are less likely to be clustered into the same segment than the two stores in FIG. 3, even though the forecast values for the two stores in FIG. 2 are the same.

Figures 4, 5:
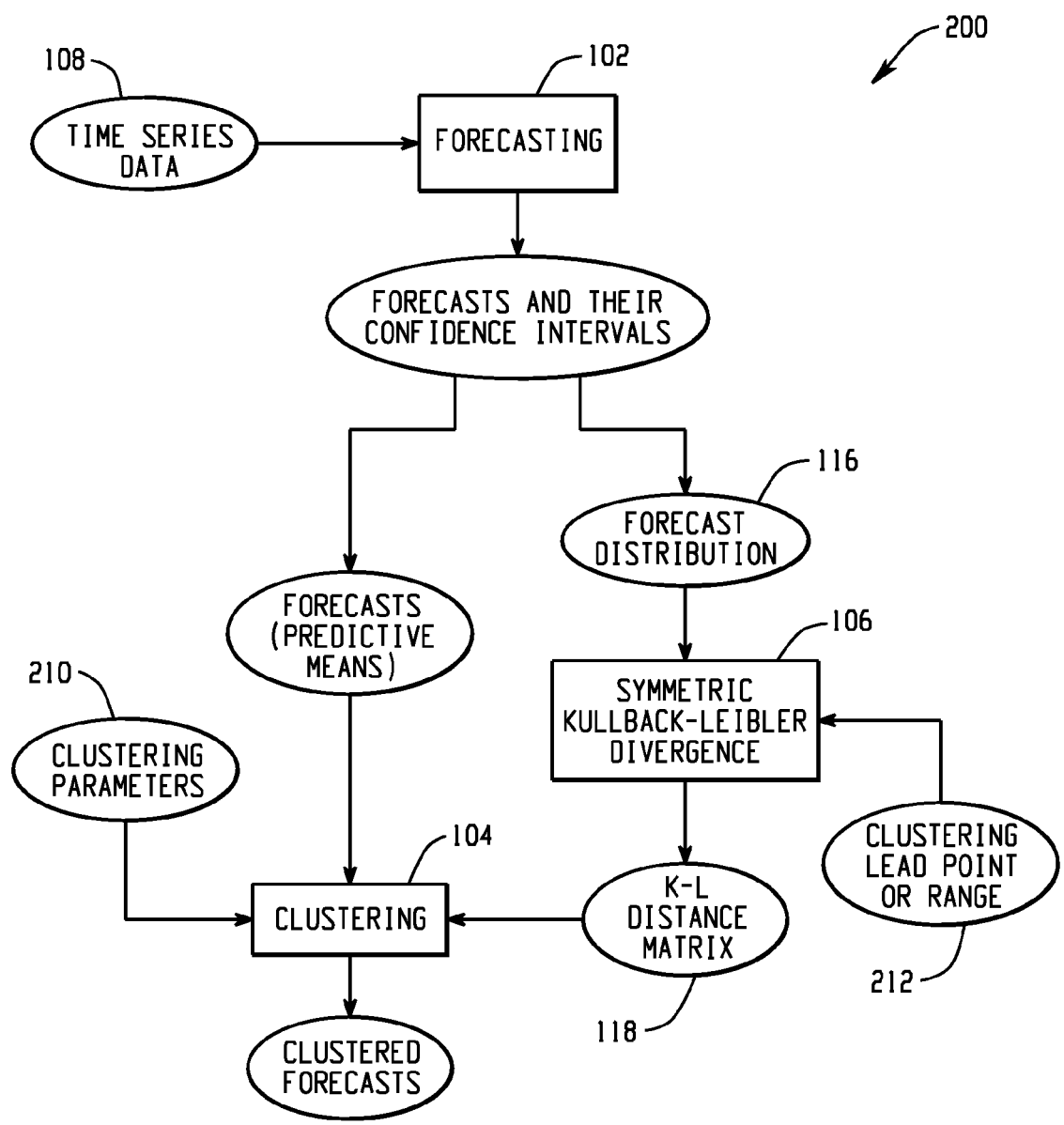

FIG. 4 is a block diagram of another example system 200 for clustering time series data based on forecast distributions. This example further illustrates possible inputs 210, 212 to the clustering block 104 and the symmetric Kullback-Leibler divergence block 106. The input 210 to the clustering block 104 may be used to set one or more parameters used by the clustering algorithm. For instance, a parameter 210 may be input to the clustering block 104 to specify a fixed number of clusters. In another example, the number of clusters may be automatically selected, for example using the Cubic Cluster Criterion (CCC) in the SAS® Enterprise Minter™ software, with a parameter 210 being input to provide a CCC cutoff value. As another example, one or more parameters 210 may be input to the clustering block 104 to bound the number of clusters by a specified maximum number and/or a specified minimum number of clusters.

The input 212 to the symmetric Kullback-Leibler divergence block 106 may be used to define a specific future time point for calculating the K-L distance matrix 118 or to define a period of time in the future (i.e., a lead time period) over which to calculate the K-L distance matrix 118. An example illustrating how the system of FIG. 4 may be used to cluster forecasts at specific points in the future is illustrated in FIGS. 5-15.

FIG. 5 illustrates example parameters that may be provided to the system in order to cluster forecasts from time series data at a first point in the future. The parameter "Cluster Lead Point=1" instructs the system to generate the K-L distance matrix based on one step ahead forecast distributions. That is, with reference to FIG. 4, the K-L divergence block 106 will calculate the K-L distance matrix 118 using the forecast distribution information for a first time period in the future.

Figure 6:
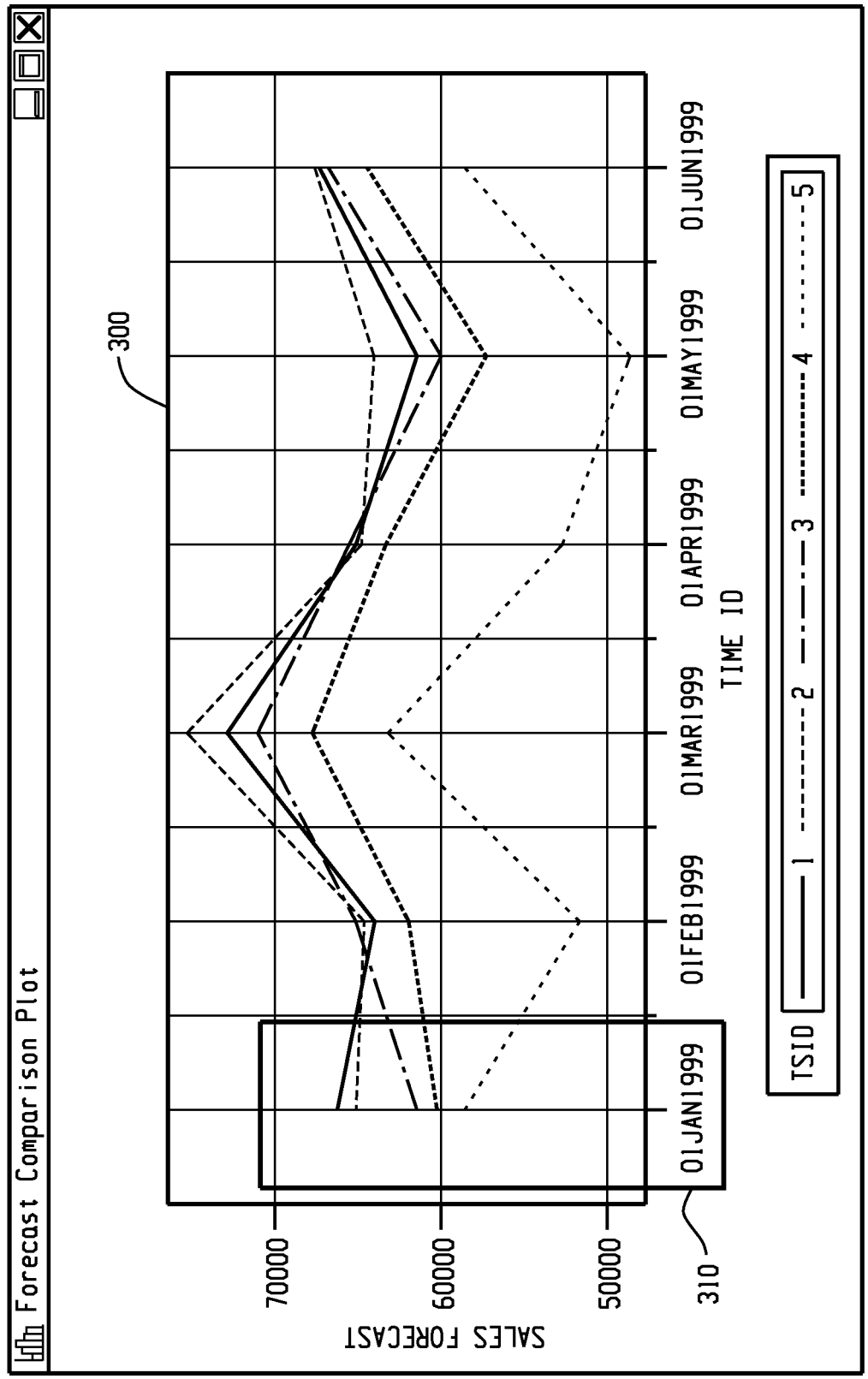

FIG. 6 illustrates a graph 300 of example forecasts generated over a six month period using time series data associated with five different database entries (TSID 1-5). For example, each line on the forecast plot (TSID 1-5) could represent forecasted sales or inventory units at a different store location over the six month period. With reference to FIG. 4, the forecast plot 300 may be generated by the forecast block 102 based on received time series data 108 for the five database entries (TSID 1-5). With reference again to FIG. 6, the box 310 centered around 1 Jan. 1999 identifies the future time period (one step ahead in this case) at which the K-L distance matrix 118 is to be generated using the forecast distribution information.

Figure 7:
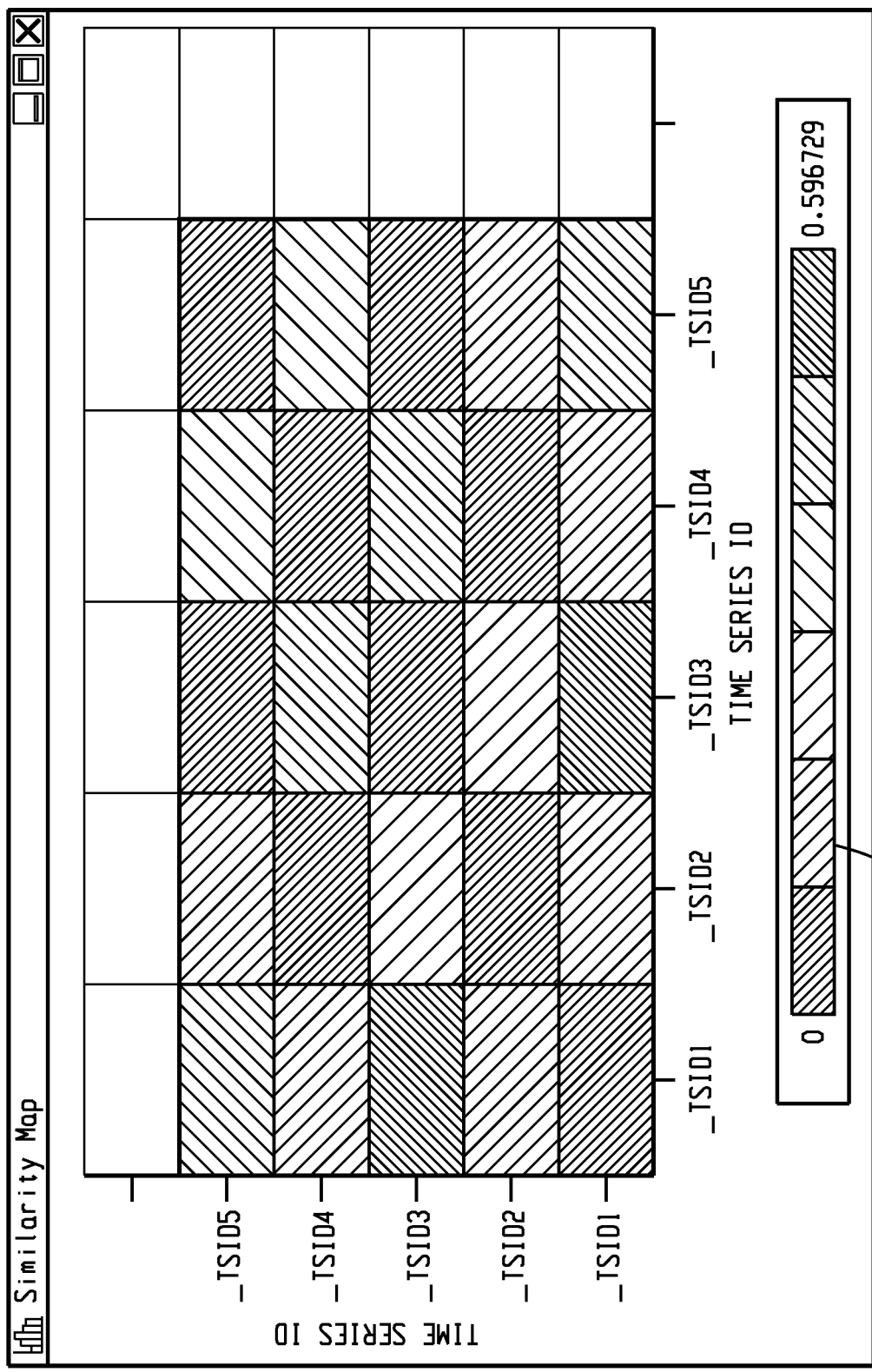
Figure 11:
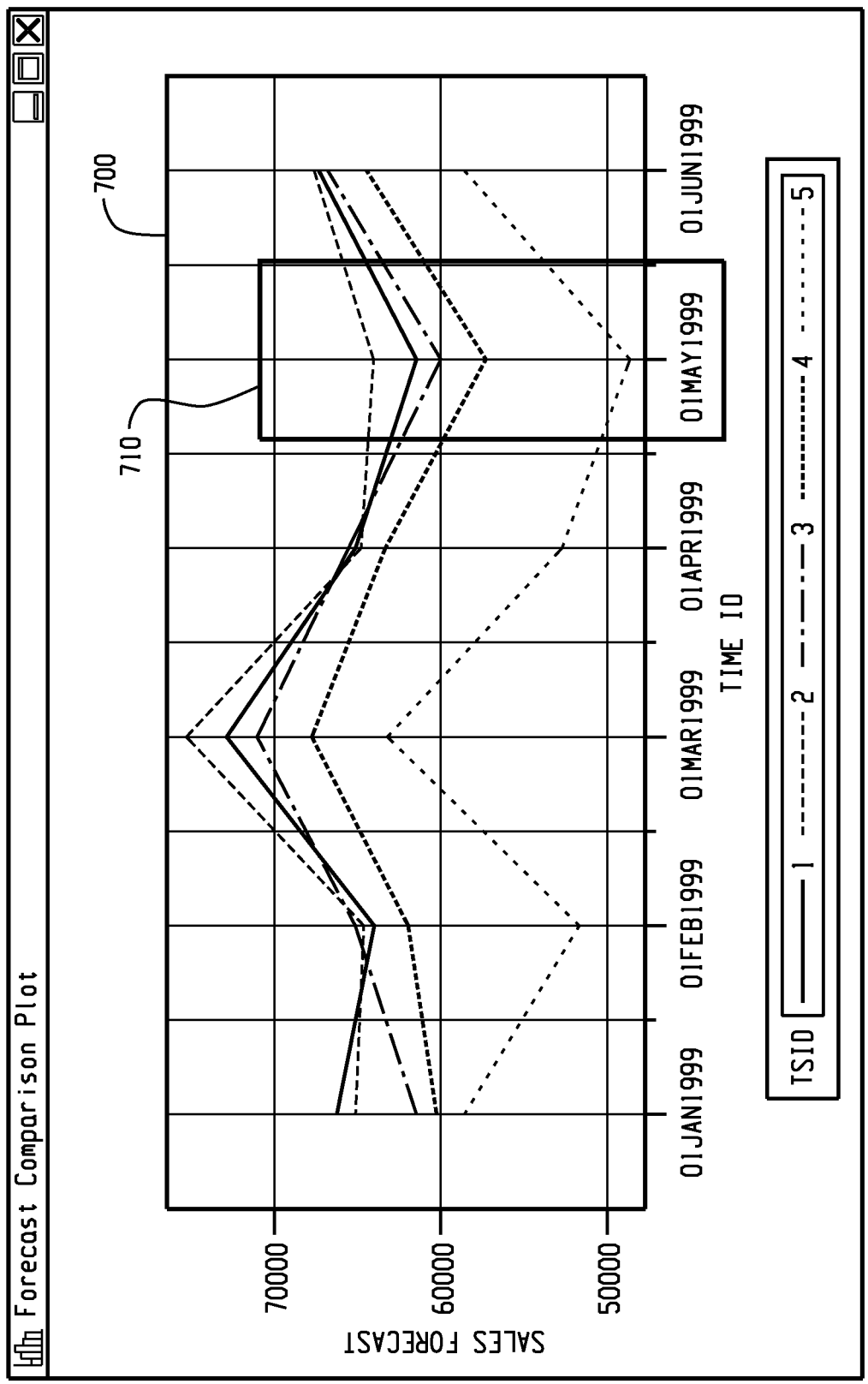

FIG. 7 illustrates an example of a K-L distance matrix 400 that may be generated based on the forecast distributions for the one step ahead time period 310 shown in FIG. 6. The illustrated matrix 400 shows K-L distance values ranging from 0 to 0.596729. The range of K-L distance values 410 may, for example, be illustrated in the matrix 400 using a range of colors or shades of the same color. In the illustrated black-and-white example, however, the range of K-L distance values 410 is depicted by dividing the range 410 into six sections, each having a different hashing pattern. It should be understood, however, that in other examples, the range of K-L distance values 410 may instead be represented with more specificity using a continuous range of colors or other indicia from the lowest K-L distance value (0 in this example) to the highest K-L distance value (0.596729 in this example).

FIG. 8 illustrates an example parameter 500 that may be input to the clustering block along with the K-L distance matrix. The parameter 500 sets the input data type to the clustering block to "distance." It should be understood that other parameters may also be provided to the clustering block to further define and/or customize the clustering operation.

An example output 600 that may be generated by the clustering block is illustrated in FIG. 9. In this example, the time series data from the five different database entries (TSID 1-5) has been clustered into three different segments based on the K-L distance matrix 400 shown in FIG. 7. The clustering results are illustrated in the form of a pie chart 610 that may be used to compare the size of the respective cluster segments and a cluster table 620 that shows which segment (1-3) that each TSID has been clustered into. As illustrated, the cluster table 620 may also provides additional information, such as location information or other information to help identify the source of each time series database entry.

Figure 12:
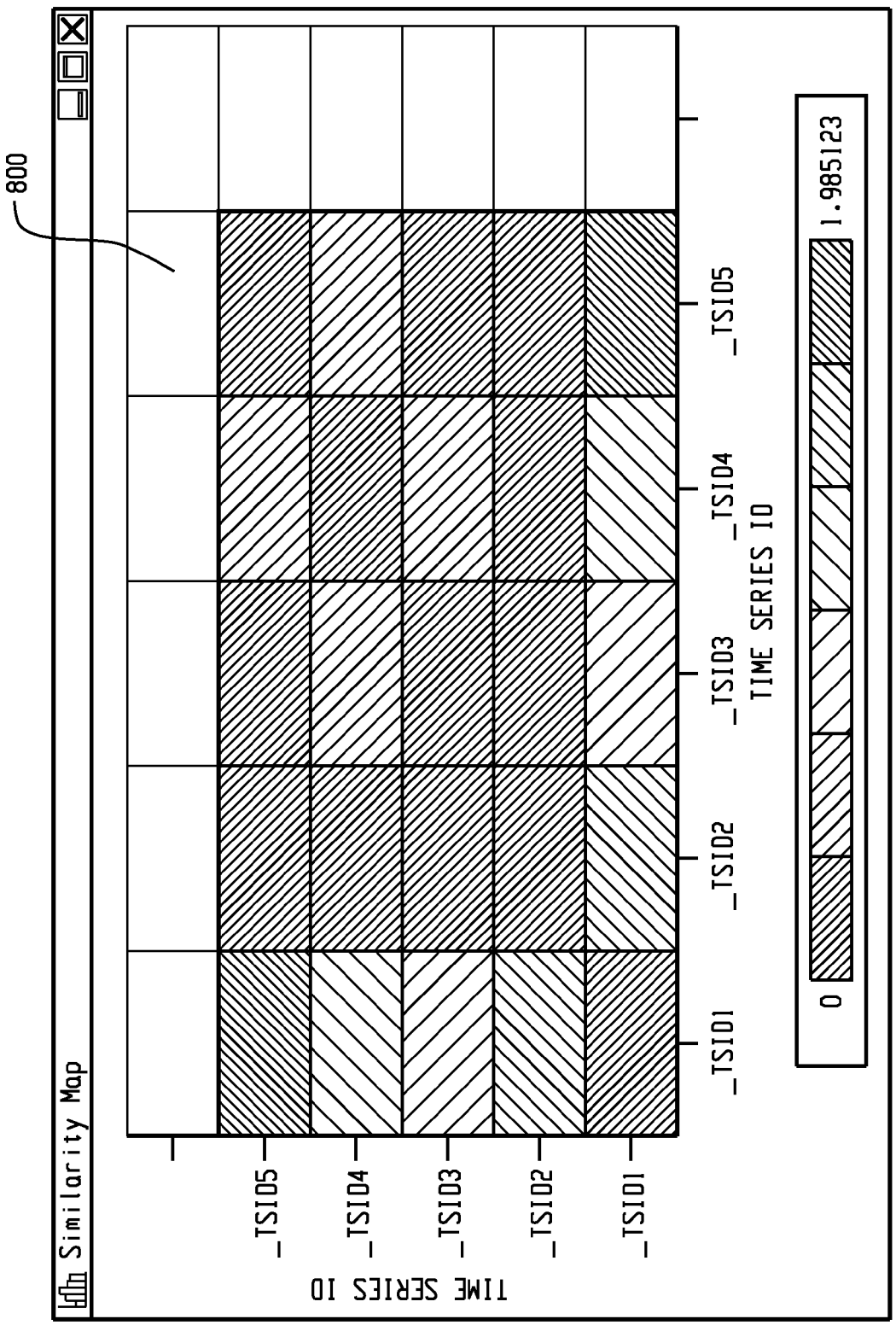
Figure 13:
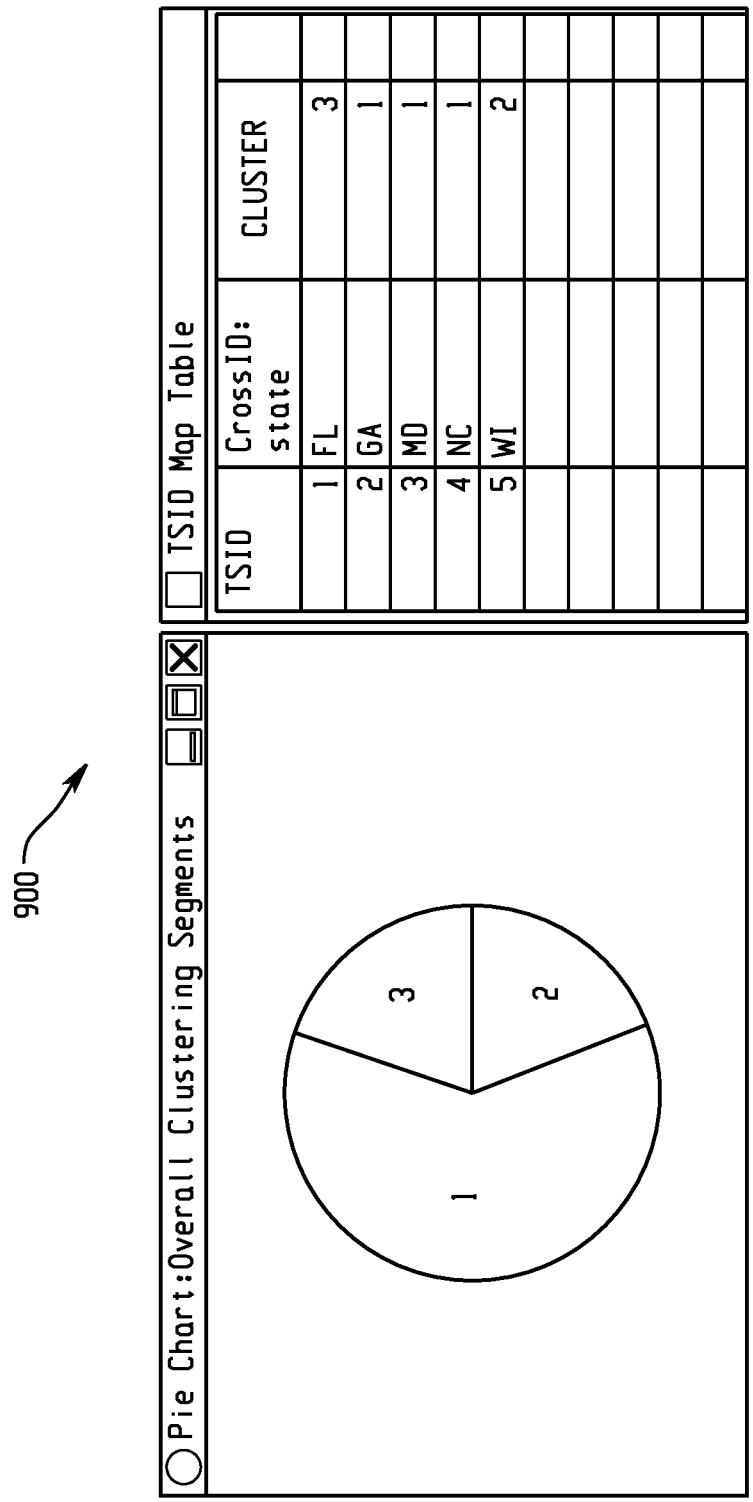

FIGS. 10-13 illustrate a second example in which the forecasts of the time series data are clustered at a later point in the future. FIG. 10 depicts example parameters to instruct the system to generate the K-L distance matrix five time period steps in the future (Cluster Lead Point=5). The forecasts for the five example database entries (TSID 1-5) are again shown in the graph 700 depicted at FIG. 11, with the box 710 now centered around the five step time period, 1 May 1999, to identify the time period being clustered. The resultant K-L distance matrix 800 generated based on the forecast distributions for the fifth time period (1 May 1999) is depicted at FIG. 12. FIG. 13 illustrates an example output 900 from the clustering block that is generated based on the K-L distance matrix 800 for the five step time period.

Figure 14:
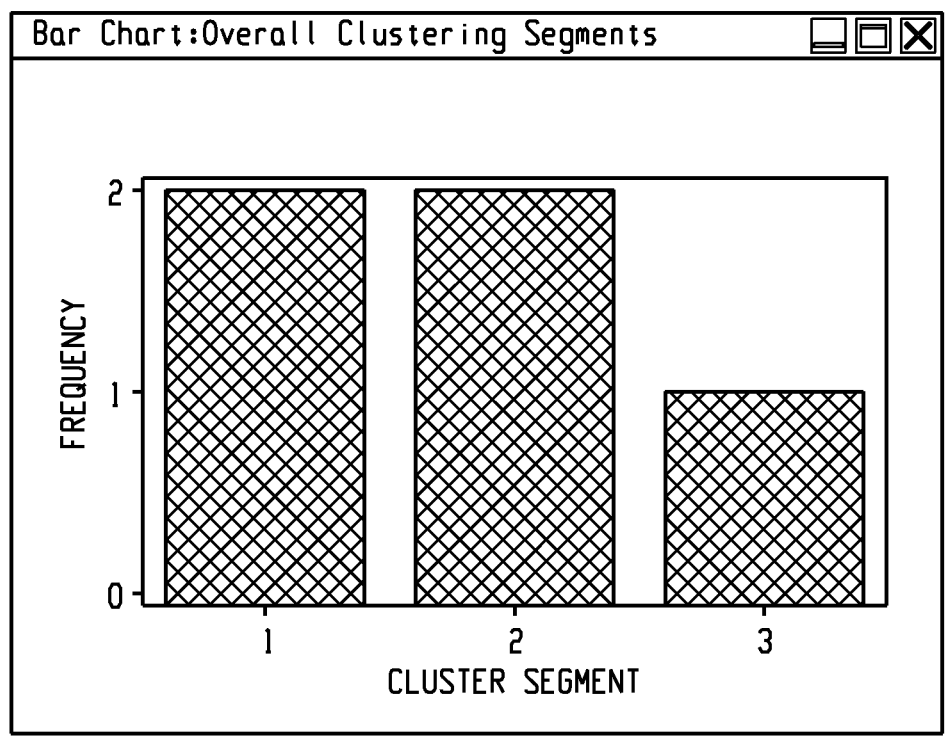
Figure 15:
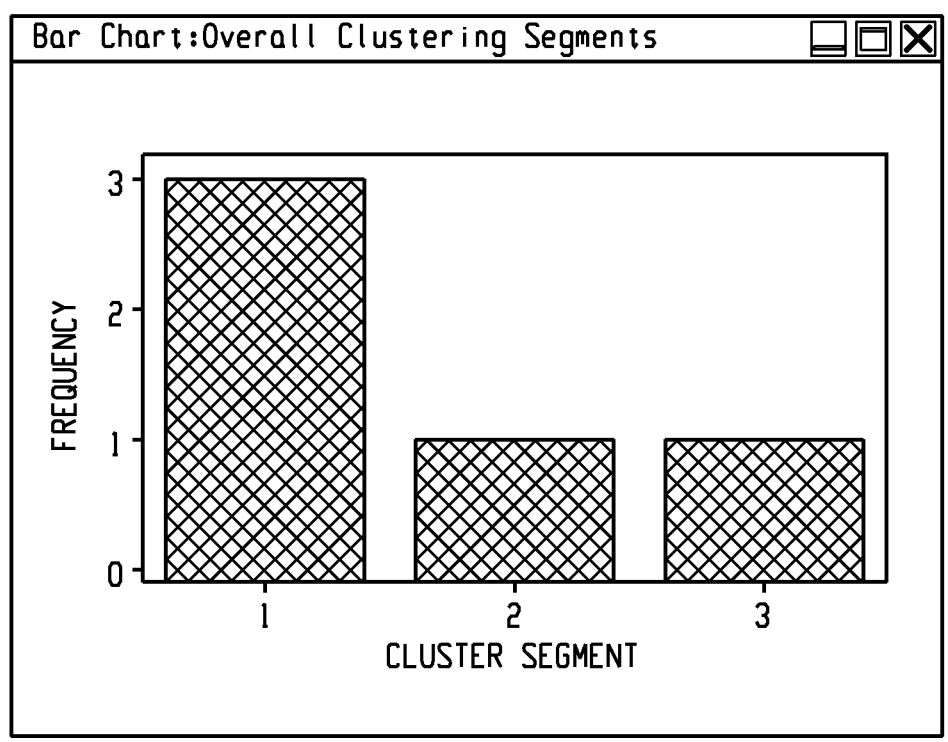

FIGS. 14 and 15 depict bar graphs that may be generated to compare cluster outputs for the same time series data at two different future time periods. In the illustrated example, FIG. 14 depicts a graph of the cluster segments generated for the one step time period in FIG. 9, and FIG. 15 depicts a graph of the cluster segments generated for the five step time period in FIG. 13. Comparing the graphs in FIGS. 14 and 15, it can be seen that from the step one time period (January, 1999) in FIG. 14 to the step five time period (May, 1999) in FIG. 15, one TSID has moved from the second cluster segment to the first cluster segment.

Figure 16:
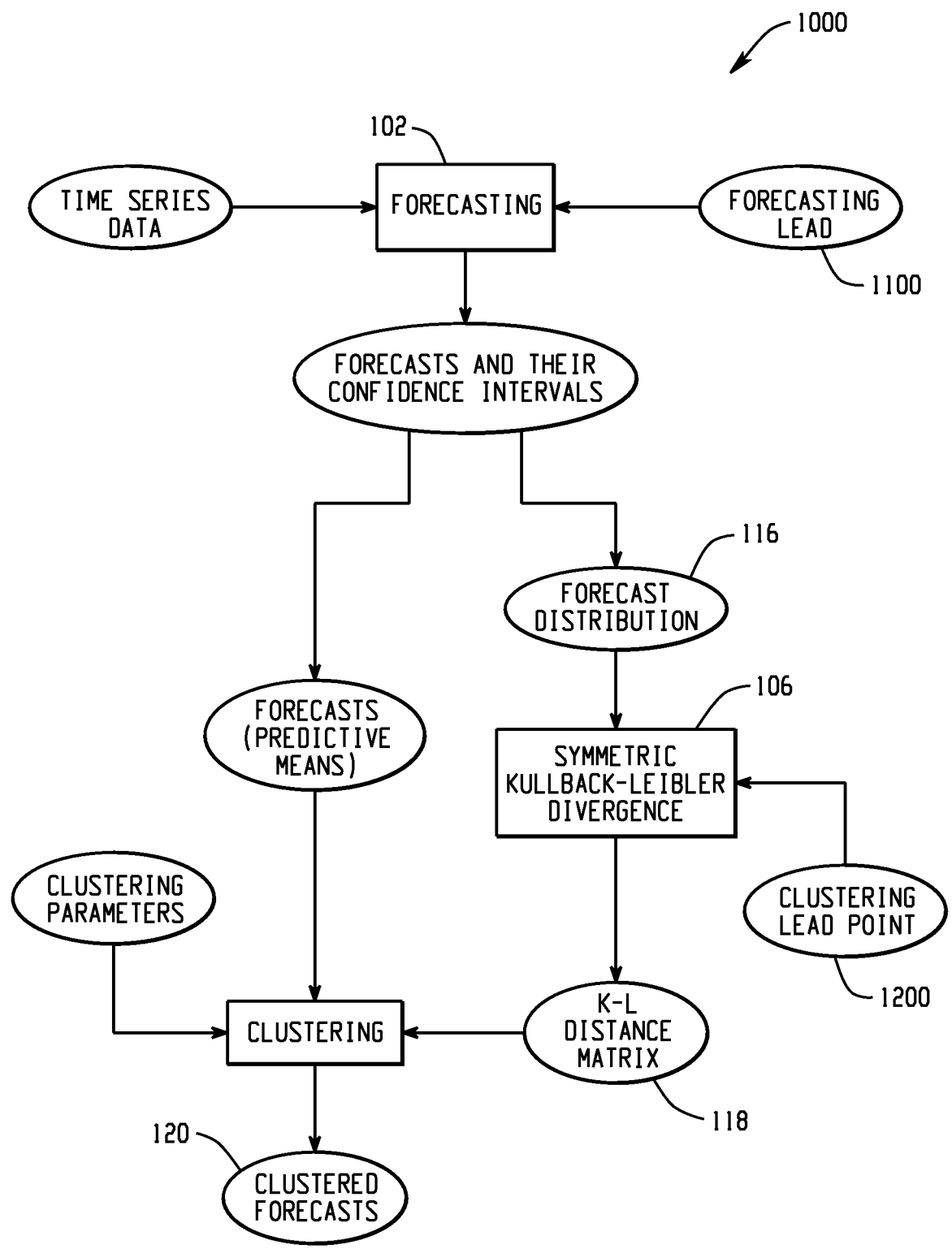
FIG. 16 is a block diagram of another example system for clustering time series data based on forecast distributions.

FIG. 16 is a block diagram of another example system 1000 for clustering time series data based on forecast distributions. This example illustrates example inputs 1100, 1200 that may be used to define a period of time in the future (i.e., a lead time period) over which to calculate the K-L distance matrix 118 and generate clustered forecasts 120. Specifically, a forecasting lead parameter 1100 may be provided to the forecasting block 102 that identifies the time period of interest. In addition, a clustering lead point parameter value 1200 may be input to the symmetric Kullback-Leibler divergence block 106 to cause the K-L distance matrix 118 to be calculated based on the summation, average or other linear combination of forecast distributions 116 over the time period specified by the forecasting lead parameter 1100. For example, a clustering lead point value 1200 of zero may instruct the Kullback-Leibler divergence block 106 that the K-L distance matrix 118 is to be calculated using the summation over all lead points.

An example of forecasting lead 1100 and clustering lead point 1200 parameter values is illustrated in FIG. 17. In the example of FIG. 17, the forecasting lead parameter is set to 6 and the clustering lead point parameter is set to 0. As an example, a forecast lead parameter value 1110 of 6 may be provided to the forecasting block 102 in order to generate clustered forecasts 120 over the first six time periods (e.g., six months.) In response to the forecasting lead parameter 1100, the forecasting block 102 generates a forecast distribution 116 over the specified six time periods. The clustering lead point parameter of 0 then instructs the Kullback-Leibler divergence block 106 to calculate the K-L distance matrix 118 based on the summation of the forecast distributions over all of the lead points, which in this case will include the first 6 time periods specific by the forecasting lead parameter.

FIG. 18 illustrates a clustered output 1300 that may be generated based on the example parameters from FIG. 17. This example 1300 is generated from the same five forecasts (TSID 1-5) shown in FIGS. 6 and 11. Comparing FIG. 18 with FIGS. 9 and 13, it can be seen that different clustering results may be obtained when clustering forecasts at specific clustering lead points and when clustering forecasts over a lead time period. Specifically, in the illustrated examples, clustering at a lead point of one (FIG. 9) resulted in TSIDs 3 and 5 being clustered into segment 1, TSIDs 2 and 4 being clustered into segment 2 and TSID 1 being clustered into segment 3. When clustered at a lead point of five (FIG. 13), TSIDs 2-4 were clustered into segment 1, TSID 5 was clustered into segment 2 and TSID 1 was clustered into segment 3. When clustered over the entire lead time period (FIG. 18), another result is obtained with TSIDs 2, 3 and 5 being clustered into segment 1, TSID 4 being clustered into segment 2, and TSID 1 being clustered into segment 3. The ability to consider these different forecast clustering results and to compare the forecasts clustered at specific lead points with forecasts clustered over a lead time period, may provide useful information in making business decisions. For instance, a comparison of the forecast clustering results may show that the clusters (e.g., the segmentation of retail stores) vary depending on the business time or cycle and their objectives.

Figure 19:
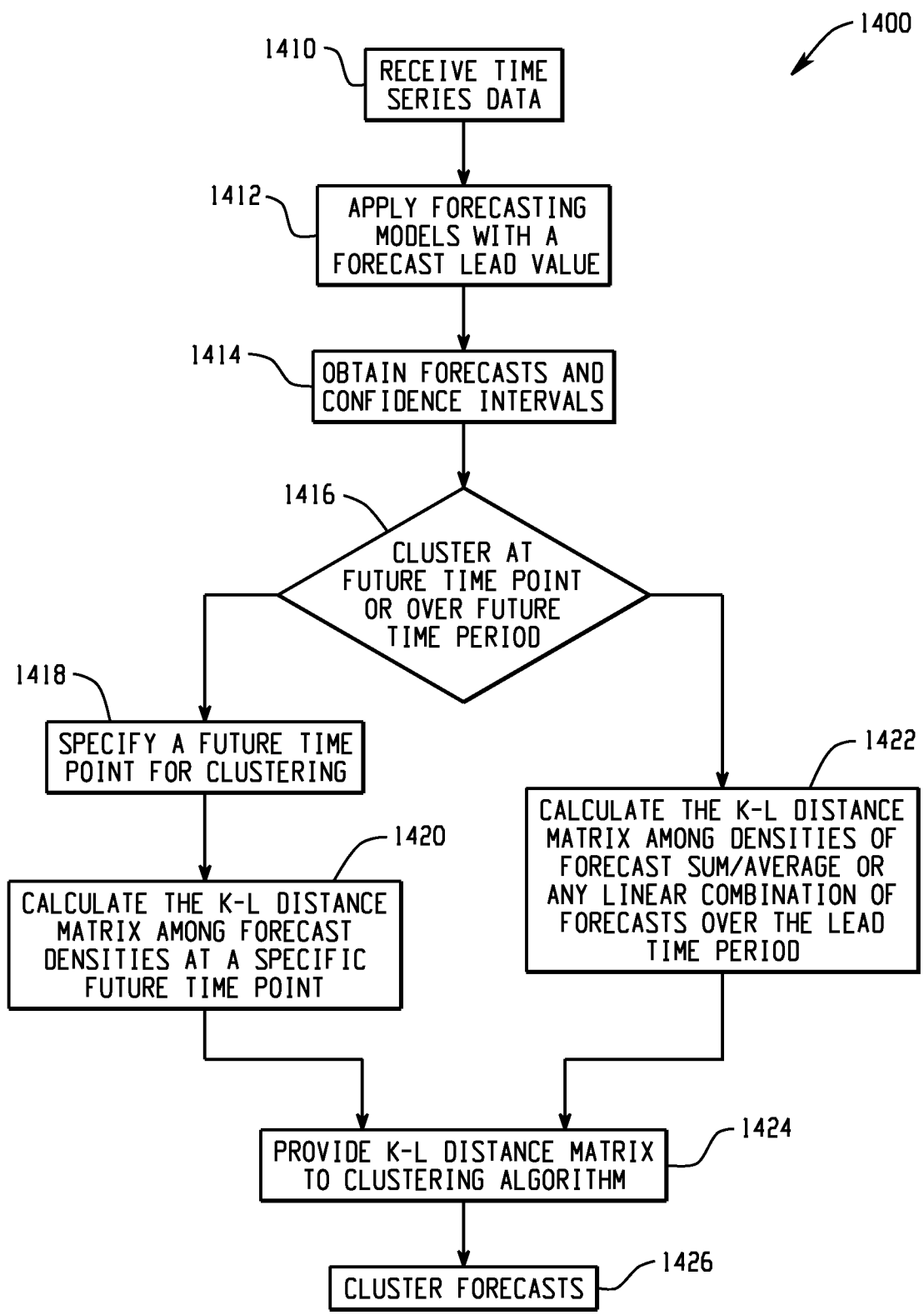
FIG. 19 is a flow diagram of an example method for clustering time series data based on forecast distributions.

FIG. 19 is a flow diagram of an example method 1400 for clustering time series data based on forecast distributions. At 1410, time series data is received relating to one or more aspects of a physical process, such as time series data relating to inventory items, time series data relating to sales, and/or other suitable types of time series data. At 1412, a forecasting model is applied to the time series data with a forecast lead value to generate forecasts and associated confidence intervals. The forecasting operation at 1412 may, for example, be implemented using a moving average (weighted) model, an exponential smoothing model, an autoregressive model, an autoregressive integrated moving average model (ARIMA), or some other suitable type of forecasting model. The forecasts and confidence intervals generated by the forecasting operations are obtained at step 1414.

At 1416, a decision is made as to whether the forecast clustering is to be performed at a specific future time point (i.e., a lead point) or over a future time period (i.e., a lead time period). This decision may, for example, be based on one or more parameter settings, such as a forecasting lead parameter, as described above. If the forecast clustering is based on a specific lead point, then the method proceeds to 1418. Otherwise, if the forecast clustering is based on a lead time period, then the method proceeds to 1422.

If clustering at a specific time point, the specific lead point is specified at 1418. The specific future time point may, for example, be specified by one or more parameter settings, such as a clustering lead point parameter, as described above. Then, at 1420 a K-L distance matrix is calculated using the forecast densities at the specified lead point. Otherwise, if clustering over a future time period, the K-L distance matrix is calculated at 1422 using a summation, average, or some other linear combination of forecasts over the lead time period. In either case, the K-L distance matrix may be calculated using a symmetric Kullback-Leibler divergence algorithm that utilizes the same distribution information that is used during the forecasting process to generate the confidence interval.

At 1424, the K-L distance matrix from 1420 or 1422 is provided to a clustering algorithm to generate a clustered output at 1426. The clustering operation at 1424 may be implemented using a hierarchical clustering algorithm, such as single-link clustering, average-link clustering or complete-link clustering, or in other examples may be implemented using another distance-based clustering algorithm.

It should be understood that similar to the other processing flows described herein, one or more of the steps and the order in the flowchart may be altered, deleted, modified and/or augmented and still achieve the desired outcome.

Figure 20A:
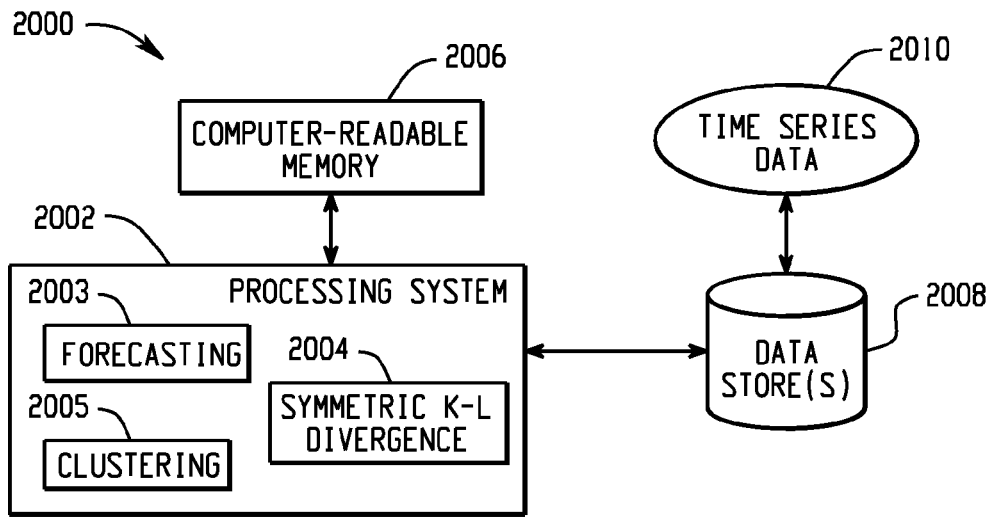
FIGS. 20A, 20B, and 20C depict examples of systems that may be used to implement the clustering of time series data based on forecast distributions.
Figure 20B:
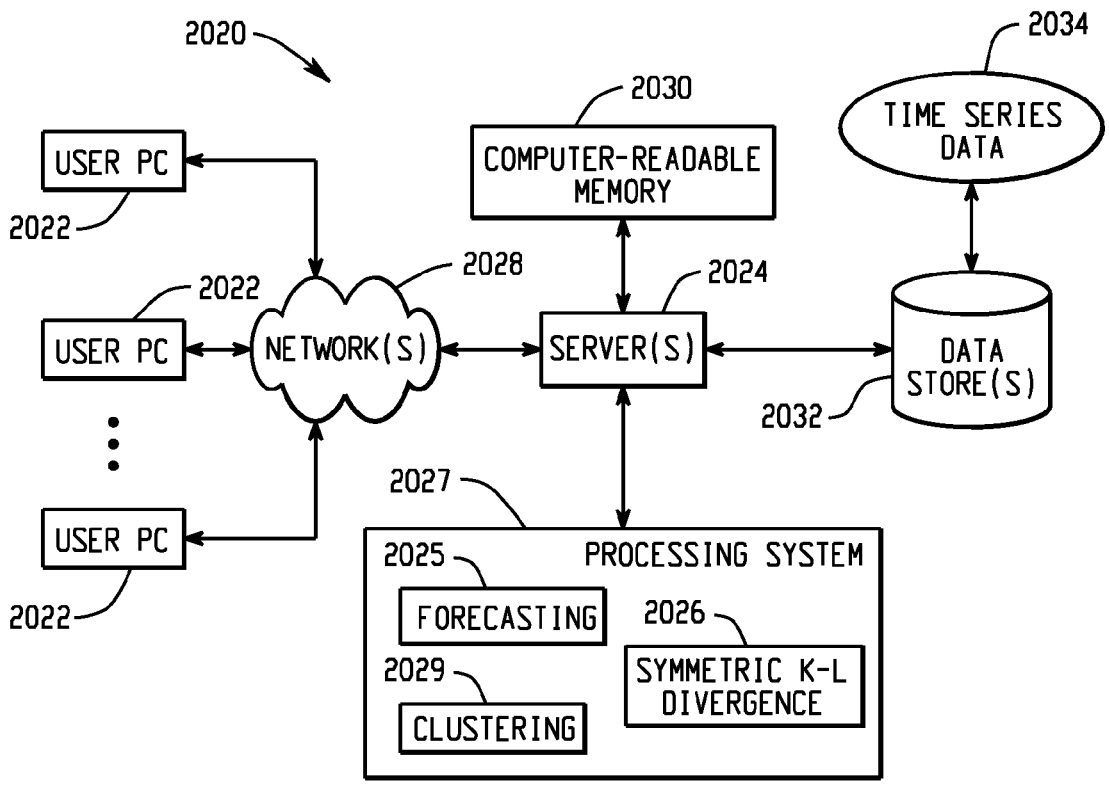
Figure 20C:
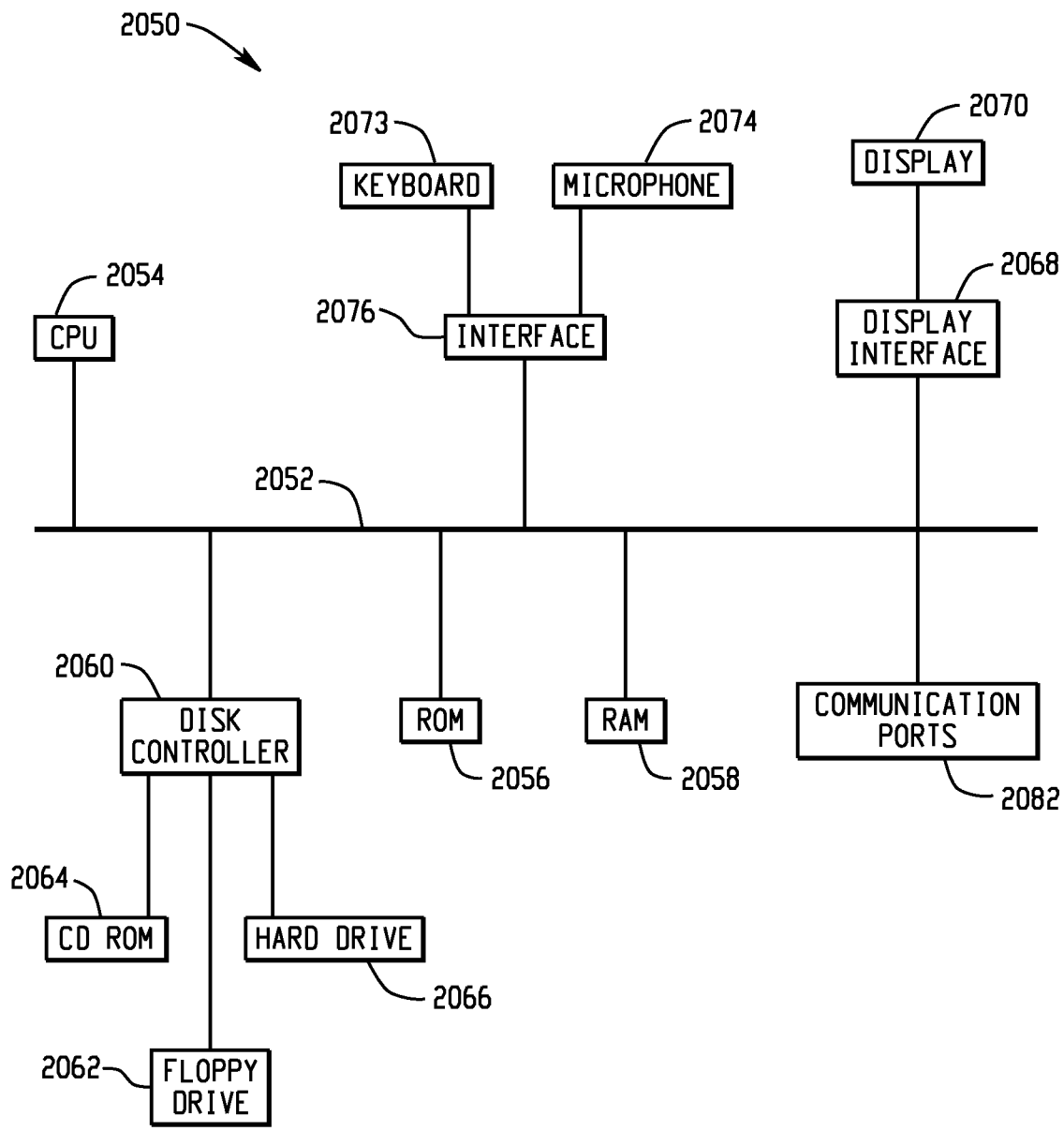

FIGS. 20A, 20B, and 20C depict examples of systems that may be used to implement the clustering of time series data based on forecast distributions. For example, FIG. 20A depicts an example of a system 2000 that includes a standalone computer architecture where a processing system 2002 (e.g., one or more computer processors) includes a forecasting program 2003, a symmetric K-L divergence program 2004 and a clustering program 2005 being executed on it. The processing system 2002 has access to a computer-readable memory 2006 in addition to one or more data stores 2008. The one or more data stores 2008 may include received time series data 2010.

FIG. 20B depicts a system 2020 that includes a client server architecture. One or more user PCs 2022 access one or more servers 2024 running a forecasting program 2025, a symmetric K-L divergence program 2026 and a clustering program 2029 on a processing system 2027 via one or more networks 2028. The one or more servers 2024 may access a computer readable memory 2030 as well as one or more data stores 2032. The one or more data stores 2032 may contain received time series data 2034.

FIG. 20C shows a block diagram of an example of hardware for a standalone computer architecture 2050, such as the architecture depicted in FIG. 20A that may be used to contain and/or implement the program instructions of system embodiments of the present invention. A bus 2052 may connect the other illustrated components of the hardware. A processing system 2054 labeled CPU (central processing unit) (e.g., one or more computer processors), may perform calculations and logic operations required to execute a program. A processor-readable storage medium, such as read only memory (ROM) 2056 and random access memory (RAM) 2058, may be in communication with the processing system 2054 and may contain one or more programming instructions for performing the method of clustering time series data based on forecast distributions. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 2060 interfaces one or more optional disk drives to the system bus 2052. These disk drives may be external or internal floppy disk drives such as 2062, external or internal CD-ROM, CD-R, CD-RW or DVD drives such as 2064, or external or internal hard drives 2066. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 2060, the ROM 2056 and/or the RAM 2058. Preferably, the processor 2054 may access each component as required.

A display interface 2068 may permit information from the bus 2052 to be displayed on a display 2070 in audio, graphic, or alphanumeric format. Communication with external devices may optionally occur using various communication ports 2072.

In addition to the standard computer-type components, the hardware may also include data input devices, such as a keyboard 2073, or other input device 2074, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate a situation where only the disjunctive meaning may apply.

It is claimed:

1. A computer-implemented method, comprising:
   accessing a set of variables, wherein accessing is performed at a computing device;
   accessing time series data with respect to each of the variables of the set;
   with respect to each of the variables of the set, forecasting values and determining a distribution of the forecasted values, wherein forecasting includes using a forecasting model and the time series data accessed with respect to each of the variables;
   identifying all possible variable pairs, wherein each of the variable pairs consists of two of the variables of the set;
   with respect to each of the variables pairs, calculating a divergence metric using the distributions of the forecasted values for the variables of the respective variable pair; and
   defining clusters such that at least one of the clusters includes two or more of the variables of the set, wherein defining the clusters is performed using a hierarchical clustering algorithm and is based on the calculated divergence metrics, wherein each of the divergence metrics is a symmetric Kullback-Leibler divergence metric, wherein, with respect to each of the variable pairs, the calculated symmetric Kullback-Leibler divergence metric is equal to:

$$\frac{1}{2}\{KLD(\rho_1 \Pi \rho_0) + KLD(\rho_0 \Pi \rho_1)\},$$

wherein:

$$KLD(\rho_1 \Pi \rho_0) = \frac{1}{2\sigma_1^2}[(\mu_1 - \mu_0)^2 + (\sigma_1^2 - \sigma_0^2)] + \log\frac{\sigma_0}{\sigma_1};$$

and $$KLD(\rho_0 \Pi \rho_1) = \frac{1}{2\sigma_0^2}[(\mu_0 - \mu_1)^2 + (\sigma_0^2 - \sigma_1^2)] + \log\frac{\sigma_1}{\sigma_0},$$

and wherein:
$\sigma_0$ is the standard deviation of the forecasted values for a first one of the variables of the variable pair, $\sigma_1$ is the standard deviation of the distribution of forecasted values for the other variable of the variable pair, $\mu_0$ is the average value of the forecasted values for the first one of the variables of the variable pair, and $\mu_1$ is the average value of the forecasted values for the other variable of the variable pair.

2. The method of claim 1, wherein the forecasting model includes at least one of:
   an exponential smoothing model;
   a moving average model;
   an autoregressive model; or
   an autoregressive integrated moving average model.

3. The method of claim 1, wherein the hierarchical clustering algorithm includes at least one of a single-link clustering algorithm, an average-link clustering algorithm, or a complete-link clustering algorithm.

4. The method of claim 1, further comprising:
   applying a common pricing policy based on at least one of the defined clusters.

5. The method of claim 1, further comprising:
   receiving a clustering parameter specifying a number of clusters, wherein defining the clusters is based on the clustering parameter.

6. The method of claim 1, further comprising:
   generating a distance matrix based on the Kullback-Leibler divergence metrics.

7. A computer-implemented system, comprising:
   one or more data processors; and
   one or more non transitory computer-readable storage media containing instructions operable to cause the one or more processors to perform operations including:
   accessing a set of variables;
   accessing time series data with respect to each of the variables of the set;
   with respect to each of the variables of the set forecasting values and determining a distribution of the forecasted values, wherein forecasting includes using a forecasting model and the time series data accessed with respect to each of the variables;
   identifying all possible variable pairs, wherein each of the variable pairs consists of two of the variables of the set;
   with respect to each of the variables pairs, calculating a divergence metric using the distributions of the forecasted values for the variables of the respective variable pair; and
   defining clusters such that at least one of the clusters includes two or more of the variables of the set, wherein defining the clusters is performed using a hierarchical clustering algorithm and is based on the calculated divergence metrics, wherein each of the divergence metrics is a symmetric Kullback-Leibler divergence metric, wherein, with respect to each of the variable pairs, the calculated symmetric Kullback-Leibler divergence metric is equal to:

$$\frac{1}{2}\{KLD(\rho_1\Pi\rho_0) + KLD(\rho_0\Pi\rho_1)\},$$

wherein:

$$KLD(\rho_1\Pi\rho_0) = \frac{1}{2\sigma_1^2}[(\mu_1 - \mu_0)^2 + (\sigma_1^2 - \sigma_0^2)] + \log\frac{\sigma_0}{\sigma_1};$$

and $$KLD(\rho_0\Pi\rho_1) = \frac{1}{2\sigma_0^2}[(\mu_0 - \mu_1)^2 + (\sigma_0^2 - \sigma_1^2)] + \log\frac{\sigma_1}{\sigma_0},$$

and wherein:
$\sigma_0$ is the standard deviation of the forecasted values for a first one of the variables of the variable pair, $\sigma_1$ is the standard deviation of the distribution of forecasted values for the other variable of the variable pair, $\mu_0$ is the average value of the forecasted values for the first one of the variables of the variable pair, and $\mu_1$ is the average value of the forecasted values for the other variable of the variable pair.

8. The system of claim 7, wherein the forecasting model includes at least one of:
an exponential smoothing model;
a moving average model;
an autoregressive model; or
an autoregressive integrated moving average model.

9. The system of claim 7, wherein the hierarchical clustering algorithm includes at least one of a single-link clustering algorithm, an average-link clustering algorithm or a complete-link clustering algorithm.

10. The system of claim 7, wherein the operations further include applying a common pricing policy based on at least one of the defined clusters.

11. The system of claim 7, wherein the operations further include:
receiving a clustering parameter specifying a number of clusters,
and wherein defining the clusters is performed based on the clustering parameter.

12. A computer-program product tangibly embodied in a non-transitory machine-readable storage medium, the computer-program product including instructions operable to cause a data processing apparatus to perform operations including:
accessing a set of variables;
accessing time series data with respect to each of the variables of the set;
with respect to each of the variables of the set, forecasting values and determining a distribution of the forecasted values, wherein forecasting includes using a forecasting model and the time series data accessed with respect to each of the variables;
identifying all possible variable pairs, wherein each of the variable pairs consists of two of the variables of the set;
with respect to each of the variables pairs, calculating a divergence metric using the distributions of the forecasted values for the variables of the respective variable pair; and
defining clusters such that at least one of the clusters includes two or more of the variables of the set, wherein defining the clusters is performed using a hierarchical clustering algorithm and is based on the calculated divergence metrics, wherein each of the divergence metrics is a symmetric Kullback-Leibler divergence metric, wherein, with respect to each of the variable pairs, the calculated symmetric Kullback-Leibler divergence metric is equal to:

$$\frac{1}{2}\{KLD(\rho_1\Pi\rho_0) + KLD(\rho_0\Pi\rho_1)\},$$

wherein:

$$KLD(\rho_1\Pi\rho_0) = \frac{1}{2\sigma_1^2}[(\mu_1 - \mu_0)^2 + (\sigma_1^2 - \sigma_0^2)] + \log\frac{\sigma_0}{\sigma_1};$$

and $$KLD(\rho_0\Pi\rho_1) = \frac{1}{2\sigma_0^2}[(\mu_0 - \mu_1)^2 + (\sigma_0^2 - \sigma_1^2)] + \log\frac{\sigma_1}{\sigma_0},$$

and wherein:
$\sigma_0$ is the standard deviation of the forecasted values for a first one of the variables of the variable pair, $\sigma_1$ is the standard deviation of the distribution of forecasted values for the other variable of the variable pair, $\mu_0$ is the average value of the forecasted values for the first one of the variables of the variable pair, and $\mu_1$ is the average value of the forecasted values for the other variable of the variable pair.

13. The computer-program product of claim 12, wherein a forecasting model includes at least one of:
an exponential smoothing model;
a moving average model;
an autoregressive model; or
an autoregressive integrated moving average model.

14. The computer-program product of claim 12, wherein the hierarchical clustering algorithm includes at least one of a single-link clustering algorithm, an average-link clustering algorithm or a complete-link clustering algorithm.

15. The computer-program product of claim 12, wherein the operations further include:
applying a common pricing policy based on at least one of the defined clusters.

16. The computer-program product of claim 12, wherein the operations further include:
receiving a clustering parameter specifying a number of clusters,
wherein defining the clusters is based on the clustering parameter.

17. The method of claim 1, wherein, with respect to each of the variables of the set:
the forecasted values and the distribution of the forecasted values are associated with a future time period;
determining the distribution of the forecasted values includes adding multiple distributions of values, wherein each of the added distributions is associated with a particular time during the future time period and represents one of the forecasted values; and
forecasting the values includes determining the multiple distributions that are added.

18. The system of claim 7, wherein, with respect to each of the variables of the set:
the forecasted values and the distribution of the forecasted values are associated with a future time period;
determining the distribution of the forecasted values includes adding multiple distributions of values, wherein each of the added distributions is associated with a particular time during the future time period and represents one of the forecasted values; and forecasting the values includes determining the multiple distributions that are added.

19. The computer-program product of claim 12, wherein, with respect to each of the variables of the set:

the forecasted values and the distribution of the forecasted values are associated with a future time period;

determining the distribution of the forecasted values includes adding multiple distributions of values, wherein each of the added distributions is associated with a particular time during the future time period and represents one of the forecasted values; and forecasting the values includes determining the multiple distributions that are added.

\* \* \* \* \*